Figure 1:
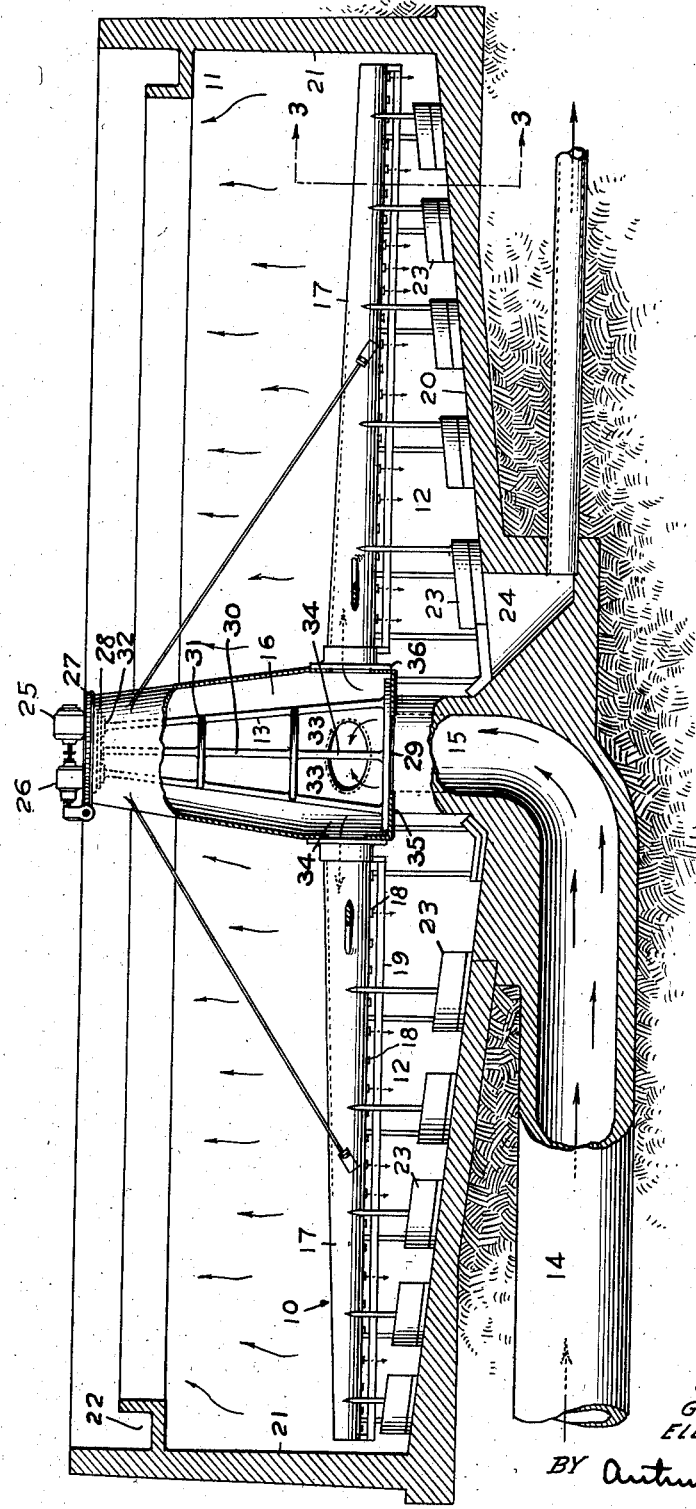

Patented Nov. 18, 1941

2,263,168

UNITED STATES PATENT OFFICE 2,263,168

SEDIMENTATION

John V. N. Dorr, William C. Weber, George M. Darby, and Elliott J. Roberts, Westport, Conn., assignors to The Dorr Company, Inc., New York, N. Y., a corporation of Delaware Original application June 8, 1935, Serial No. 25,584, also substitute and continuation of application March 26, 1937, Serial No. 133,166. Divided and this application September 14, 1939, Serial No. 294,981

6 Claims. (Cl. 210—55)

This invention relates to the art of sedimentation wherein solids in suspension, or at least a substantial portion of the solids in suspension, are removed from the menstruum in which they are suspended.

The invention relates to apparatus or sedimentation units which are known as clarifiers or thickeners and which are usually characterized by a settling tank or basin having continual sediment removal therefrom as underflow and continuous removal of supernatant liquid as decanted effluent. In such apparatus there seem to exist perennial problems involving improved modes of (a) getting the liquid to be treated into the sedimentation tank or settler, and (b) of thereafter diffusing the supplied liquid into the liquid being treated in the tank. To get liquid into the tank itself is one step and the flow or distribution of fed liquid which is already held in quiescence in the tank is another step. All of this must be done while permitting full range of action of the mechanical arrangement or instrumentalities necessary for continually removing the sediment deposited on the settling floor of the tank bottom.

In our parent application Serial No. 25,584 filed June 8, 1935, and which on January 2, 1940, matured into Patent 2,185,785, there are disclosed several manners according to which incoming liquid is brought into the tank and there are described and claimed certain fundamentals relating to the manner or manners in which the liquid fed to the settling tank or liquid holding means is diffused and dispersed into the quiescent body of liquid already therein.

This is a division of the parent application above identified, and herein and hereby there is being claimed a particular manner of getting the liquid into the tank itself as this phase of the invention is useful per se with or without the liquid diffusing teachings of the parent case.

Apparatus of the present invention has a settling tank with a bottom providing an upflow opening which is sometimes referred to herein as an intermediate upflow conduit. In the construction shown herein the upflow opening is provided in a protruding region of the tank bottom, or as otherwise expressed, in a short upflow conduit providing section thereof that furnishes the base of or foundation for a stationary pier structure carried thereby and secured thereto. The feed of the tank is through the instrumentality of a pipe or conduit section disposed below the floor of the tank and that delivers the incoming liquid into the intermediate upflow conduit section just referred to.

The pier structure of the present invention is tapered and provides an upwardly and inwardly extending base portion. The tapered base portion of the pier has apertures, flow openings or windows providing passageways leading from the interior to the exterior thereof and through which inflowing liquid is delivered into the lower interior portion of a drum that surrounds the pier. The base of the pier has an opening registering with the delivery end of the intermediate conduit and because of the bottom section of the pier being tapered and having flow openings or apertures left therein, there is realized an easy and gradual transition in the flow path from a vertical direction upwardly and outwardly to the base of the pier into the lower regions of the carrying drum or cage.

There then follows a forward upward flow within the low section of the drum which in the preferred form is turnable. Such flow of liquid within the drum causes the liquid to hold and carry with it all of the solid particles entrained therein and thereby preventing any substantial settling or undue accumulation of solids within the space between the lower portion of the drum on the one hand and the stationary portion of the tank bottom or pier structure on the other hand.

In the specific embodiment or form of the invention shown, the drum is in the form of a tubular member having at the lower portion thereof a ring-sealing construction functionally disposed between it and the base of the pier structure, or as otherwise expressed, between it and the upflow conduit section constituting the foundation of or base for the pier whereby there is prevented any substantial escape of liquid from the region between the drum on the one hand and the stationary bottom of the tank on the other hand. Sediment removing means are preferably provided which comprises sediment treating blades or rakes movable in closed paths over the tank floor by motivating structure that derives support from the pier and which may be associated with the turnable drum.

Certain novel features of the present invention according to one aspect thereof may be viewed as relating to a pier structure which has an apertured tapered base portion and also the cooperative association with such pier structure of a surrounding tubular arm-carrying member in the form of a depending rake-arm carrying drum so disposed relative to the apertures in the base portion of the pier that it directly receives within the lower portion thereof liquid passing thereto from the lower interior portion of the pier.

Certain features of novelty respecting the invention hereof reside in the formation of the pier; the relation between the feed conduit, pier and turnable drum; the relationship between the turnable drum and the stationary tank bottom; and the relationship between the stationary tank bottom and the stationary pier.

More specifically stated, however, novelty resides in using a tapering pier; in having a specially designed pier apertured in its bottom or base portion; in having sealing means between the turnable drum and the tank portion while avoiding pocketing liquid adjacent thereto; and in the insuring of an upward flow of liquid from the conduit section through and upward to and out of the apertures of the pier and into the marginal apertured drum.

The description that follows is taken largely from our parent application above identified herein.

Figure 2:
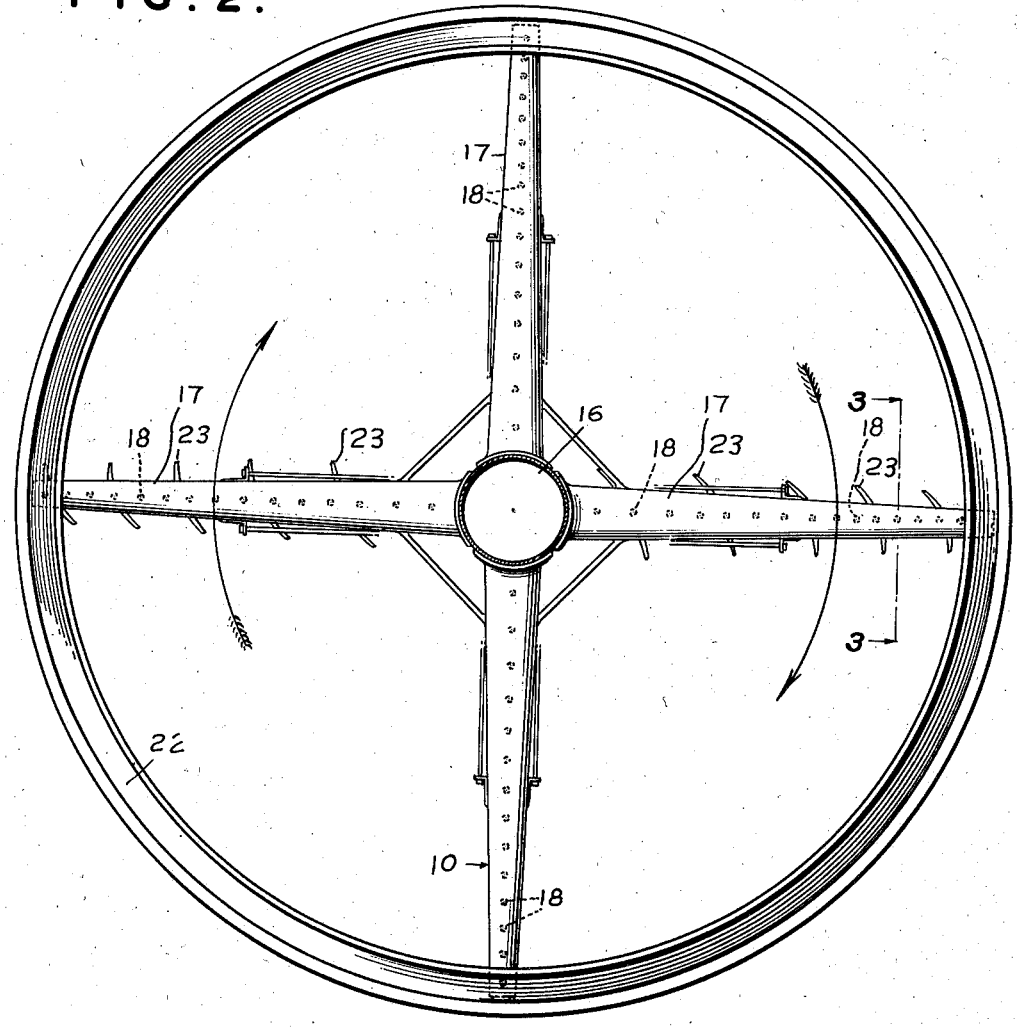

In the accompanying drawings:

Figs. 1 and 2 are respectively vertical and plan views on one form of sedimentation apparatus for realizing features of the invention hereof.

Figure 3:
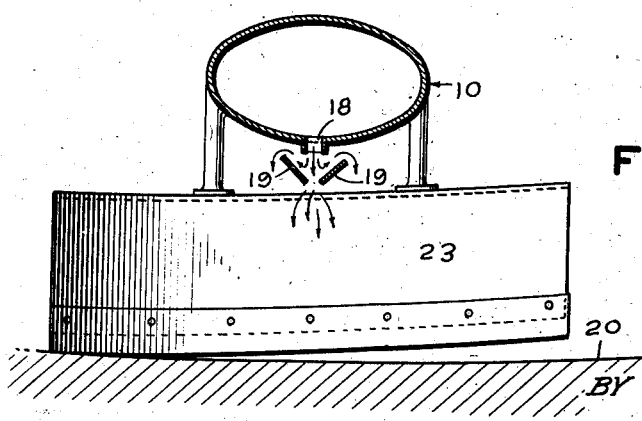

Fig. 3 is a vertical sectional view of an arm of the rotatable mechanism of Figs. 1 and 2, and is a view taken as on a plane indicated by the line 3—3 of Figs. 1 and 2, looking in the direction of the arrows.

In the drawings the feed distributing device or feed mechanism 10 is shown adapted to a circular basin or tank 11 usually formed of concrete. Arranged in the tank 11 is a sludge or settled solids raking and collecting mechanism 12 which is rotatable about a vertically extending axis, and the feed mechanism and the sludge collecting mechanism have been combined so as to provide a rotatable combined feed distributing and sludge collecting mechanism. The rotatable mechanism just described is supported in any suitable manner from a tapered central pier or column 13 and is driven by mechanism that derives support from said pier in any suitable manner, for example, after the teachings of the Scott Patent No. 1,888,743 granted November 22, 1932. This mode of support and central drive for the rotatable sludge raking mechanism is old and well known and by the invention hereof there is incorporated in connection with this rotatable mechanism novel means for getting incoming liquid into the tank.

In the showing in the drawings the feed enters through a conduit 14 providing the lower or bight section of an inverted siphon having an upwardly extending delivery leg 15 constituting an intermediate conduit section provided in or by the tank bottom or by a hollow protuberance thereof which serves as or provides a foundation for the tapered pier or column. The intermediate conduit section 15 discharges into the tapering base portion of the central pier or column 13. Through and from certain apertures or window like openings as 33 in the lower portion of the pier the liquid passes into a rotatable distributing drum or well 16 for ultimate discharge into a surrounding sedimentation zone. The drum or well 16 is supported by and depends from a horizontally-turnable bearing member 27 that is hereinafter referred to more in detail. In the embodiment shown herein radial feed distributor pipes, ducts or conduits 17 extend from the drum or well 16. The turnable bearing member 27 and the drum or well 16 depending therefrom constitute a horizontally-turnable carrier for the pipes or conduits 17 and thus indirectly for the raking elements or blades 23 which are in turn supported by and depend from the conduits 17. The radial feed distributing pipes 17 therefore become carrier arms for the raking blades 23 and it will be appreciated that the arms or pipes 17 in fact constitute members common to a feed-distributing means and to a sludge-raking means whereby a combined feed-distributing and sludge-raking mechanism is enabled to be realized. The pipes or conduits 17 are shown in cross-section in Fig. 3. These pipes are each provided with a large number of circular downwardly directing orifice portions or orifices 18 spaced in accordance with the available settling area of the basin. The space arrangement is such that there will be very few or very small orifices at the center or central portion of the tank and a larger number or larger orifices at the outer regions, or in other words, at the outer portions of the radially extending pipes 17.

This arrangement of the orifice portions 18 is readily ascertainable from an inspection of Fig. 1. The orifice portions 18 may or may not be, but preferably are, in the form of directing nozzles and they may or may not be, but preferably are, provided with diffuser baffles or plates 19. These diffuser plates function to effect a diffusion or more uniform distribution of the liquid-solids mixture.

In the sedimentation apparatus shown, the tank 11 has a sloping bottom 20 and upstanding walls 21 carrying the effluent launder construction which is provided by an effluent overflow trough or launder 22 that delivers the normal level of the body of liquid in the settling tank. The sludge raking and collecting mechanism 12 includes a number of raking blades or scrapers 23 which function to rake the sedimented sludge or settled solids from the diverse sections of the bottom or settling area of the tank; to collect the sludge or solids thus raked; and ultimately to convey the same to the discharge section or sediment receiving sump 24, from which they are ultimately passed or withdrawn under controlled conditions from the sedimentation tank or basin 11. The combined rotatable feed distributing and sludge raking or collecting mechanism comprises the horizontally-turnable bearing member 27 that is mounted on a stationary bearing member 28 at the top of the central pier 13 and which in turn deriving support from the latter. The combined feed distributing and sludge collecting mechanism is driven in any suitable manner as from the motor 25 which derives support from the pier or hollow structure 13 and which functions through the medium of power transmission mechanism 26 having means that imparts operative rotary movement to the horizontally-turnable bearing member 27 of the combined rotatable mechanism whereby the sludge engaging elements or raking blades thereof turn in closed horizontal paths about a vertical axis that substantially aligns with the pier or hollow column.

The section of the sedimentation basin which is served and scraped by the feed discharge mechanism may be considered as the sludge or solids receiving zone, and it is to be noted that the several orificed portions 18—and the associated diffuser plate construction 19—function to deliver a relatively uniform amount of material per unit of settling area in and throughout the horizontal transversely extending zone which is located within the lower portion of the tank immediately above the sludge settling zone referred to. This horizontal zone in which the feed material, or in other words, the solid-liquid mixture is delivered, is in a zone which is referred to herein as the liquid receiving zone.

The arrows in Fig. 1 indicate the upward flow path for the column of liquid in the sedimentation chamber or basin 11 and may also indicate how there is a relatively sharp turn or change in direction in the uppermost portion of the liquid column or body of sedimenting effluent. These arrows indicate how the course of travel for the effluent—clarified effluent—is ultimately in an outward radial direction towards and into the effluent launder 22.

The effluent launder 22 is marginally arranged in respect to the tank and is carried directly on and by the upstanding peripheral wall construction 21 of the tank 11.

The low conduit or bight section 14 is located below the floor or settling area of the tank and it supplies liquid to the upwardly extending flow delivery leg 15. It will be noted that the construction providing the tank or basin proper includes in the bottom section thereof a portion which may be referred to as constituting an upflow conduit section or apertured portion which provides the upflow feed opening or discharge leg 15 and that any liquid solids mixture passing from and upwardly directed by this leg 15 is delivered directly and upwardly into the lower interior portion of the pier or column 13.

The pier or column just referred to is stationary. In the form shown it has an apertured section or a skeleton formation and comprises members suitably connected to provide the required strength and rigidity to meet the load and operative strains imposed upon it. The pier structure 13 has an annular or ring-shaped base member 29 that substantially registers with the upflow delivery opening of the upwardly extending leg 15. The pier structure also has horizontally spaced upwardly extending supporting members 30, vertically spaced cross tie members 31 and a horizontal cap portion or cap member 32 upon which the stationary bearing member 28 is provided. The pier rises from the stationary bottom portion of the tank and has sufficient upward extent for the stationary bearing member 28 to be located at an elevation slightly higher than that of the normal level of the liquid in the tank which level is determined by the overflow lip of the launder or trough 22. The pier has several apertures, flow openings or windows 33. At least some of these apertures, flow openings or windows are provided in the regions immediately above the lower base ring member 29 and between the supporting members 30 extending upwardly therefrom. From these apertures or flow openings which are thus provided in or by the pier structure the onflowing liquid is passed into the drum or well 16 wherein the velocity of flow is substantially reduced or slowed down because of the relatively large flow area or volume or expansion space left within the drum or well 16.

The drum or well 16 constitutes a vertically-extending tubular member and egress from the bottom thereof is substantially cut off by and because of associated sealing rings as 35 and 36 or their equivalent provided between the lower end of the tubular member or drum on the one hand and the stationary structure of the tank on the other hand.

Radial distributing ducts 17 have been mentioned and it is to be noted that they function as carrier arms for the several rakes or sediment-engaging blades 23 which collectively constitute sediment engaging, impelling and transferring elements. These arms 17 together with raking blades 23 constitute that which is sometimes referred to as a rake arm structure embodying or carrying sediment engaging, impelling and transferring elements turnable in closed horizontal paths about a vertically-extending axis, or as otherwise expressed, turnable about the pier 13. These rake carrying arms 17 are supported from the vertically-extending drum or tubular member 16 and extend from the lower portion of the latter. The peripheral or marginal portion of the drum 16 is apertured to provide peripheral flow openings at 34 through which liquid passes from the drum into the tubular members or arms 17 for distribution therefrom within the relatively quiescent liquid-holding section of the tank. In other words the inner ends of the tubular distributing arms 17 are in register with the flow openings at 34 and are supported from the drum 16 whereby they function not only as flow-distributing arms but also as rake-carrying arms.

The base ring or annular member 29 of the pier structure constitutes not only a base member of the pier proper but also has associated therewith an annular member or ring-shaped portion 35 that functions as a stationary sealing ring or element provided on or constituting a part of the stationary bottom of the tank. The tubular arm-carrying member or flow distributing well 16 embodies or is provided at the lower end thereof with an annular element or ring-shaped portion 36. The horizontally-turnable ring-shaped member 36 extends proximate, in fact has overlapping relationship with the stationary sealing ring 35 provided by or at the bottom of the pier, or as otherwise expressed, provided on the apertured rising portion or protuberance of the tank bottom. These ring-shaped members or annular sealing elements or portions 35 and 36 are disposed in cooperative relationship with respect to each other and the combined purpose thereof is to prevent the egress or discourage the flow of any substantial amount of liquid from the interior of the drum through the space between said rings into the regions of said tank which may be viewed as exteriorly located with respect to the drum 16 which has peripheral openings or marginal apertures as 34 which collectively provide flow discharge area leading from the drum. It will be observed that the flow delivery from the pier through the low portion of the windows thereof into the drum is sufficiently low or proximate the sealing construction to prevent or avoid any substantial accumulation of the sediment within the lower regions of the drum with the result that all of the liquid-solids mixture received within the pier and passing therefrom is caused to move forwardly with the flowing liquid through and from the peripheral apertures or marginal flow transmission openings provided in or by the wall portion of the tubular drum or arm carrying well 16.

The drum 16 may be referred to as the inflow slowing-down and feed distributing well and by the combined arrangement of the features constituting the same, including parts associated therewith, there is realized a construction for obtaining a relatively uniform distribution of incoming liquid within the relatively quiescent settling zone within the tank. The construction is such that the discharge or transfer of liquid from the drum or well 16 is primarily from regions at elevations above that whereat the sealing ring construction is located. There is no substantial escape of solids downwardly from the drum, to wit, between the lower end of the drum on the one hand and the stationary structure of the tank on the other hand as such egress or flow is prevented or opposed because of the sealing ring construction described.

It will also be noted that the tubular drum and the sealing ring construction provided at and between the lower end of the drum and the stationary structure at the base of the pier constitutes a barrier for preventing any direct flow of liquid or of liquid-solids mixture from the upflow section 15 to the sump or sediment discharge 24.

From the drawings hereof it will be seen that the annular base member 29 of the pier is relatively large, that the upwardly and inwardly inclined supporting member 30 thereof and the cross tie members 31 thereof result in a tapering pier construction which is provided with apertures or flow openings in the relatively large base portion thereof. The relatively small upper portion has a small cap member provided with a stationary bearing smaller in diameter as compared with the outside diameter of the base member 29. The flow openings in the large tapering base portion thereof permit a ready and direct flow of incoming liquid from the lower interior portion of the pier into the tubular rake arm carrying member or liquid distributing drum. The tapering construction of the pier leads to a relatively light, compact, but strong and rigid structure well designed to support the loads thereupon and to withstand the operative reactive forces to which it is subjected during the normal operation of the sediment raking mechanism and the parts associated therewith. The employment of the tapering pier construction also permits the employment of a tubular rake arm supporting drum which is large at the bottom and which diminishes in size in passing towards the top, or as otherwise expressed, it permits the use of a tubular member or drum which is substantially smaller at the top than at the bottom. This construction also favors the employment of a relatively small turnable supporting bearing for the drum, to wit, one which is much smaller in diameter than would be the case if the small cap for the pier had not been provided. One phase of the invention relates to the tapered pier construction. A more specific phase thereof relates to the employment with the tapering pier of the tapered carrying drum, and all of this leads to the practical employment of a turnable bearing construction of less horizontal diameter than would be the case if the tapering features had not been embodied in the pier and drum construction shown.

Certain phases of the present invention revolve about novel features of construction and arrangement of parts employed in or embodied by the stationary pier and by the horizontally-turnable combined feeding and sediment raking mechanism. Of the features just referred to some relate to the novel embodiment and employment of the sealing construction between the stationary structure of the tank bottom or pier base on the one hand and the bottom or lower portion of the horizontally-turnable arm-carrying drum or distributing well on the other hand, while other features relate to the employment and location of the pier discharge windows or flow openings through which inflowing liquid passes on its way into the tubular arm-carrying drum or well 16 and of which at least some of the liquid is delivered directly into the regions immediately over the sealing construction provided by the cooperating stationary and horizontally-turnable sealing rings.

The application upon which this patent is based is (a) a division of parent application Serial No. 25,584, filed June 8, 1935, which on January 2, 1940, matured into Patent No. 2,185,785, entitled "Sedimentation processes and apparatus" and (b) also a continuation of and substitute for an application Serial No. 133,166, filed March 26, 1937, as a division of the parent application above identified entitled "Sedimentation."

We claim:

1. A sedimentation unit having a tank with a bottom and marginal wall, means for overflowing clarified supernatant liquid from the tank that thereby determines the normal level of the body of liquid undergoing quiescent sedimentation within the tank, a hollow pier for the tank provided with flow openings leading from the interior to the exterior thereof, an influent conduit section leading to and provided for delivering incoming liquid into the hollow pier, a turnable peripherally-apertured drum disposed in spaced relationship with respect to the pier whereby a liquid-receiving space is provided exteriorly of the pier and within the drum, and motor-actuated means for turning said drum about said pier; said unit being characterized in that a submerged sealing means is provided between the lower portion of the drum and the pier for substantially closing the space between the pier and the lower portion of the drum, and in that certain flow openings of the pier extend proximate a region within the drum that is at an elevation lower than that of the general elevation of the apertures of the drum so that liquid flowing from such low pier openings sweeps upwardly solids which might otherwise tend to accumulate and remain entrapped in the lower interior portion of the drum whereby solids entering the drum pass through said apertures of the drum for ultimate reception into the liquid-holding region exteriorly disposed with respect to the drum.

2. A sedimentation unit having a settling tank with a bottom and marginal wall, outflow means having an overflow section for overflowing clarified supernatant liquid from the tank and determining the normal surface level of a relatively quiescent body of liquid within the tank, a hollow pier for the tank provided with flow openings leading from the interior to the exterior thereof, a conduit section leading to and delivering into the interior of the pier, a peripherally-apertured tubular member encircling said pier and providing a liquid-receiving space within itself, sediment-transferring bladed elements, and motivated means for turning said elements about said pier; said unit being characterized in that a submergedly-disposed stationary ring-shaped sealing element is provided that is connected to and extends from the base of the pier, in that the turnable member provides a ring-shaped sealing element disposed so as to extend proximate said stationary ring-shaped sealing element whereby said sealing elements have a substantially abutting relationship one with the other at elevations substantially lower than that of said overflow section and functioning for preventing any substantial escape of liquid from within the turnable member past said sealing elements into the surrounding body of liquid.

3. A sedimentation unit as defined in and by claim 2 in which the cooperating ring-shaped sealing elements are disposed in overlapping relationship with respect to each other.

4. A settling unit as defined in and by claim 2 further characterized in that certain of the flow openings leading from the interior of the pier have extent to elevation adjacent the lowermost regions within the turnable member.

5. A sedimentation unit comprising in combination a settling tank with a bottom and marginal wall and having outflow means with a weir for overflowing supernatant liquid from the tank and determining the normal level of liquid undergoing sedimentation within the tank, a hollow pier for the tank having flow discharge openings leading from the interior of the pier to the exterior thereof, a conduit section delivering into the apertured section of the pier, sediment-transferring means comprising a rake-carrying arm and a turnable drum that carries the arm, said drum encircling the pier and provided with a flow discharge area leading therefrom having at least an outflow section at an elevation lower than that of the weir, and motor-actuated means for turning said drum and the arm carried thereby along closed paths about the pier; said unit being characterized in that a submerged stationary ring portion is provided adjacent the lower end of the pier and extends therefrom, and a submerged movable ring portion is provided at the lower end of the turnable drum and in proximity with respect to said stationary ring portion and extends sufficiently close to the latter for avoiding any substantial passage of inflowing liquid from between said ring portions as the apparatus normally functions.

6. A sedimentation unit comprising in combination a settling tank with a bottom and marginal wall and having means for overflowing supernatant liquid from the tank that thereby determines the normal operative level of the liquid undergoing quiescent sedimentation within the tank, a hollow pier for the tank having flow discharge openings leading from the interior of the pier to the exterior thereof, a conduit section for delivering feed liquid into the hollow section of the pier, a turnable drum encircling the pier and provided with at least one flow discharge opening leading therefrom through which liquid in transit passes on its way into the liquid undergoing quiescent sedimentation, and motor-actuated means for turning said drum about the pier; two ring sections for said unit of which one is stationary and is on the pier while the other is at the lower end of the turnable drum, said ring section being at elevation substantially lower than that of the normal operative level in the tank as determined by said means for overflowing supernatant liquid from the tank and are sufficiently close whereby there is avoided any substantial passage of liquid between them from the interior to the exterior of the drum as the apparatus functions; said unit being particularized in that certain portions of the flow discharge openings leading from the interior of the pier extend to elevations substantially as low as that of the locality whereat said ring sections are close together, and in that the said flow discharge opening leading from the drum is at an elevation vertically-spaced from said locality whereby there is realized an upflow of feed liquid within the drum sufficient to carry upwardly between the pier and drum as well as outwardly from the drum solids that would otherwise tend to settle and congregate in the space about the pier and within the lower portion of the drum.

JOHN V. N. DORR.
WILLIAM C. WEBER.
GEORGE M. DARBY.
ELLIOTT J. ROBERTS.